United States Patent
Wheatley et al.

(10) Patent No.: US 8,490,846 B1
(45) Date of Patent: Jul. 23, 2013

(54) FRICTIONAL HOLDING PAD WITH INCLINED GRIP

(75) Inventors: Alan J. Wheatley, Draper, UT (US); Bryce Craig, Alpine, UT (US)

(73) Assignee: American Covers, Inc., Bluffdale, UT (US)

( * ) Notice: Subject to any disclaimer, the term of this patent is extended or adjusted under 35 U.S.C. 154(b) by 376 days.

(21) Appl. No.: 12/987,662

(22) Filed: Jan. 10, 2011

(51) Int. Cl.
  *B60R 7/00* (2006.01)
(52) U.S. Cl.
  USPC ............ 224/483; 224/277; 224/278; 224/571
(58) Field of Classification Search
  USPC ............ 224/483, 277, 278, 929, 571; 108/43, 108/44; 296/97.3, 97.7, 97.9; 428/40.1, 41.3, 428/42.1, 156, 158, 160, 192, 194, 922
  See application file for complete search history.

(56) References Cited

U.S. PATENT DOCUMENTS

| | | | |
|---|---|---|---|
| 2,128,118 A | | 8/1938 | Burford |
| 2,243,554 A | | 5/1941 | Epstein |
| 2,466,502 A | | 4/1949 | Stiller |
| 2,573,323 A | * | 10/1951 | Eshelman ........................ 281/44 |
| 2,642,248 A | | 6/1953 | Semon |
| 2,762,868 A | | 9/1956 | Wandel |
| 2,931,489 A | * | 4/1960 | Farnholtz ....................... 224/277 |
| 3,445,135 A | | 5/1969 | Masi |
| 3,567,871 A | | 3/1971 | Walter |
| 3,654,047 A | | 4/1972 | Berkowitz |
| 3,937,491 A | * | 2/1976 | Hilding .......................... 281/44 |
| 4,026,033 A | | 5/1977 | Martin |
| 4,335,773 A | | 6/1982 | Masi |
| 4,358,488 A | | 11/1982 | Dunklin et al. |
| D278,057 S | | 3/1985 | McMaster |
| 4,528,232 A | | 7/1985 | Cliffe |
| 4,749,222 A | | 6/1988 | Idland |
| 4,759,058 A | | 7/1988 | Sutton |
| 4,815,515 A | | 3/1989 | Lee |
| 4,817,139 A | | 3/1989 | Russo |
| 4,846,382 A | * | 7/1989 | Foultner et al. ............... 224/483 |
| 4,862,944 A | | 9/1989 | Hendershot |
| D308,062 S | | 5/1990 | Leoni et al. |
| 4,944,311 A | | 7/1990 | Eldridge, Jr. et al. |
| 4,967,988 A | * | 11/1990 | Nguyen ........................ 248/150 |
| 4,986,496 A | | 1/1991 | Marentic et al. |
| 5,036,866 A | | 8/1991 | Eldrige, Jr. et al. |
| D323,829 S | | 2/1992 | Martinsen et al. |
| 5,174,607 A | * | 12/1992 | Hill ................................ 281/45 |

(Continued)

FOREIGN PATENT DOCUMENTS

| | | |
|---|---|---|
| WO | WO 02/35975 | 5/2002 |
| ZA | 20004637 | 9/2000 |

OTHER PUBLICATIONS

General Electric "Friction Pad Kit" Instructions Field Made for MPD, MPD Friction Pad; Aug. 19, 1988.
Crown Products 2002 (www.crownprod.com).

(Continued)

*Primary Examiner* — Justin Larson
*Assistant Examiner* — Lester L Vanterpool
(74) *Attorney, Agent, or Firm* — Thorpe North & Western LLP (57) ABSTRACT

A frictional pad has a pair of inclined slots in a pair of sidewalls to hold a handheld electronic device at an incline with respect to the pad. The pad can also have a squat dome.

25 Claims, 7 Drawing Sheets

U.S. PATENT DOCUMENTS

| | | | |
|---|---|---|---|
| D350,356 S | 9/1994 | Wood | |
| 5,358,094 A | 10/1994 | Molinaro et al. | |
| 5,508,084 A | 4/1996 | Reeves et al. | |
| 5,542,637 A * | 8/1996 | Schriner | 248/346.01 |
| 5,593,769 A | 1/1997 | Wolf et al. | |
| 5,599,617 A | 2/1997 | Ewald | |
| 5,638,249 A | 6/1997 | Rubino et al. | |
| 5,692,815 A * | 12/1997 | Murphy | 312/283 |
| 2,794,767 A | 8/1998 | Wilson | |
| 5,794,767 A | 8/1998 | Wilson | |
| 5,829,507 A | 11/1998 | Pawlowski | |
| 5,899,010 A | 5/1999 | Peck | |
| 6,089,516 A | 7/2000 | Yates | |
| 6,117,526 A | 9/2000 | Marks | |
| 6,164,213 A * | 12/2000 | Topps et al. | 108/43 |
| 6,206,260 B1 * | 3/2001 | Covell et al. | 224/539 |
| 6,246,764 B1 | 6/2001 | Owen et al. | |
| D449,043 S | 10/2001 | Chow et al. | |
| D449,831 S | 10/2001 | Chow | |
| D453,017 S | 1/2002 | Gledhill | |
| 6,372,323 B1 | 4/2002 | Kobe et al. | |
| 6,461,709 B1 | 10/2002 | Janssen | |
| 6,506,271 B1 | 1/2003 | Yates | |
| 6,535,606 B2 | 3/2003 | Cox | |
| 6,561,378 B1 * | 5/2003 | Roessler et al. | 221/45 |
| 6,598,653 B1 | 7/2003 | Gonzalez | |
| 6,610,382 B1 | 8/2003 | Kobe et al. | |
| 6,618,970 B1 * | 9/2003 | Fillman et al. | 40/312 |
| 6,640,477 B1 | 11/2003 | Timpson et al. | |
| 6,672,622 B2 * | 1/2004 | Barron | 281/44 |
| 6,673,409 B1 | 1/2004 | Wheatley | |
| 6,935,659 B1 * | 8/2005 | Weaver | 281/44 |
| 7,125,602 B2 | 10/2006 | Wheatley | |
| 7,159,792 B2 | 1/2007 | Wheatley | |
| 7,252,867 B2 | 8/2007 | Wheatley | |
| D555,571 S * | 11/2007 | Eskandry | D12/400 |
| 7,293,719 B2 * | 11/2007 | Wheatley et al. | 239/56 |
| D573,075 S * | 7/2008 | Eskandry | D12/203 |
| 7,910,188 B2 | 3/2011 | Wheatley | |
| 7,923,088 B2 | 4/2011 | Wheatley | |
| 2002/0119292 A1 | 8/2002 | Venkatasanthanam et al. | |
| 2004/0084492 A1 * | 5/2004 | Wheatley | 224/483 |
| 2005/0169793 A1 * | 8/2005 | Wheatley et al. | 422/5 |
| 2005/0199668 A1 * | 9/2005 | Wheatley | 224/483 |
| 2005/0271847 A1 | 12/2005 | Antonini | |
| 2006/0121250 A1 * | 6/2006 | Wheatley | 428/141 |
| 2006/0154029 A1 | 7/2006 | Antonini | |
| 2006/0196964 A1 * | 9/2006 | Wheatley et al. | 239/57 |
| 2006/0198978 A1 | 9/2006 | Antonini | |
| 2009/0004420 A1 * | 1/2009 | Wheatley | 428/40.1 |
| 2009/0072045 A1 * | 3/2009 | Wheatley et al. | 239/56 |
| 2010/0001151 A1 | 1/2010 | Wheatley | |
| 2010/0065654 A1 * | 3/2010 | Wheatley et al. | 239/56 |
| 2011/0155884 A1 | 6/2011 | Wheatley | |
| 2011/0165383 A1 | 7/2011 | Wheatley | |

OTHER PUBLICATIONS

FNN-Fleet NewsNet: Company car fleet management solutions pp. 1-4; Roadtest (www.fleetnewsnet.co.uk).

Http://www.bracketron.com/?catid=11; Bracketron Inc.; GPS Accessories; Accessed Nov. 2009, 2 pages.

http://www.bracketron.com/index.php?catied=16&pid=24, Bracketron, Inc.; Nav-Mat Portable GPS Dash Mount; accessed Nov. 2009; 2 pages.

http://www.bracketron.com/?includes/phpThumb/phpThumb. php?src=../../_products/UFM-100B . . . Bracketron Inc.; NavMat, accessed Nov. 2009, 1 page.

Dashmat Ultimate the revolutionary breakthrough dashboard cover; Saddleman Inc. 1998; 2 pages.

1999 Catalogue; Canadian Tire; 2 pages.

Related Case: U.S. Appl. No. 13/045,094, filed Mar. 10, 2011; Alan J. Wheatley.

Related Case: U.S. Appl. No. 12/979,601, filed Dec. 28, 2010; Alan J. Wheatley.

Related Case: U.S. Appl. No. 10/7914,304, filed Mar. 1, 2004; Alan J. Wheatley.

U.S. Appl. No. 13/045,057, filed Mar. 10, 2011; Alan J. Wheatley; office action issued Jun. 3, 2011.

3M, Product Bulletin PIJ180/180C, Release G, Effective Oct. 2008; 12 pages.

Cellgells Stick Almost Anywhere—Cell Phones, Music Devices, Laptops, Helmets, Cars . . . ; http://www.celgells.com; 1 page; as accessed on Jun. 5, 2009.

Egrips® Non-slip! Technology; http://www.egrips.com/technology; 2 pages; as accessed on Nov. 19, 2009.

Egrips® Non-slip! Technology; http://egrips.com/ ;3 pages; as accessed on Jun. 22, 2009.

Egrips® Non-slip! Technology; http://egrips.com/faq; 3 pages; as accessed on Jun. 22, 2009.

Grip N Stay, It's Time to Get a Grip; http://www.gripnstay.com/catalog/index.php?main_page=index; 1 page; as accessed on Dec. 4, 2009.

Non-Slip Grip-it-Strips® for Laptops; 1 page; 2010.

U.S. Appl. No. 12/987,662, filed Jan. 10, 2011; Alan J. Wheatley.

U.S. Appl. No. 12/979,609, filed Dec. 28, 2010; Alan J. Wheatley.

U.S. Appl. No. 13/045,094, filed Mar. 10, 2011; Alan J. Wheatley; notice of allowance issued Oct. 17, 2011.

U.S. Appl. No. 13/045,057, filed Mar. 10, 2011; Alan J. Wheatley; notice of allowance issued Oct. 17, 2011.

U.S. Appl. No. 12/979,690, filed Dec. 28, 2010; Alan J. Wheatley; office action dated Mar. 1, 2013.

U.S. Appl. No. 12/979,601, filed Dec. 28, 2010; Alan J. Wheatley; office action dated Mar. 1, 2013.

* cited by examiner

FRICTIONAL HOLDING PAD WITH INCLINED GRIP

RELATED APPLICATION(S)

This is related to U.S. patent application Ser. No. 12/205,059, filed Sep. 5, 2008, (US Patent Publication No. 2009-0004420); which is a continuation of U.S. patent application Ser. No. 11/264,669, filed Oct. 31, 2005, which is a continuation-in-part of U.S. patent application Ser. No. 11/021,560, filed Dec. 22, 2004 (now U.S. Pat. No. 7,252,867); which is a continuation-in-part of U.S. patent application Ser. No. 10/684,008, filed Oct. 10, 2003 (now U.S. Pat. No. 7,125,602); which is a divisional of U.S. patent application Ser. No. 10/209,948, filed Jul. 30, 2002 (now U.S. Pat. No. 6,673,409); which claims benefit of U.S. Provisional Patent Application Nos. 60/308,955, filed Jul. 31, 2001, and 60/344,571, filed Dec. 28, 2001; which are all incorporated herein by reference in their entireties and for all purposes.

This is related to U.S. patent application Ser. No. 12/979,690, filed Dec. 28, 2010; which claims benefit of U.S. Provisional Patent Application Nos. 61/371,853, filed Aug. 9, 2010, and 61/290,615, filed Dec. 29, 2009; which are all incorporated herein by reference in their entireties and for all purposes.

This is related to U.S. patent application Ser. No. 12/545,248, filed Jan. 7, 2010; which is herein incorporated by reference in its entirety and for all purposes.

BACKGROUND

1. Field of the Invention

The present invention relates generally to a frictional pad to be disposed to an upwardly facing support surface, such as a vehicle dashboard or console, and to receive a portable handheld electronic device, such as a cell phone, GPS or digital music player, thereon to substantially retain the portable handheld device on the upwardly facing support surface.

2. Related Art

Frictional holding pads have been developed for placing on a horizontal surface to hold and retain a handheld item. Some pads are simply a sheet of rubber or rubber-like material. Others are simply a sheet of rubber-like material with a matrix of apertures therethrough. Other pads are tacky with a contoured surface and can cling to a dashboard and hand held device by mechanical or specific adhesion. For example, see U.S. Pat. Nos. 6,673,409; 7,125,602 and 7,252,867; and U.S. Patent Publication No. 2009-0004420. Other devices provide a tray or container for receiving items with guard rails with cord slots therethrough. For example, see the Max Grip™ Dash Tray.

Other pads have been developed for placing on the handheld item itself. For example, see Egrips® anti-skid silicon skins or appliqués; GripNStay® adhesive grips; Grip-It-Strips® slip resistant textured strips with self adhesive backing; US Patent Publication Nos. 2006-0198978; 2006-0154029; 2005-0271847; and U.S. Pat. No. 6,117,526. See also U.S. Pat. Nos. 4,986,496; 5,508,084; 6,372,323 and 6,610,382. Stickers or decals have been developed that can be applied to cell phones. For example, see CellGells™ adhesive decals. Another pad has been developed that is tacky and clings to the handheld item. For example, see Gadget Grips® frictional pads by HandStands® and US Patent Publication No. 2006-0121250.

Still other devices have been developed to secure items, such as a GPS, in a vehicle. The GPS navigation systems are often provided with a mount to hold the system, which has a viewing screen, in a suitable position for viewing while driving. Various mounting systems have been proposed, including a suction cup that holds by suction to the windshield or dash. In some locals it is illegal to mount object to the windshield. In addition, such mounting can interfere with normal vision through the windshield. It is also possible to mount the suction cup on the vehicle dashboard or consol, but such surfaces are often contoured or provided with functional and decorative items that interfere with the operation of the suction cup. An adhesive plate is also sometimes provided that can be adhesively applied to the dash, and that can receive the suction cup. It may, however, be undesirable to us an adhesive on the dashboard as such adhesive can leave a residue or remove dash covering. Another option is a device that holds a plate in place by use of several weighted ballasts. Such devices can be bulky and unsightly. Still other devices can provide a plate or other mount secured to the dash by specific or mechanical adhesion. See for example Sticky Pad GPS Dash Mount from HandStands® and US Patent Publication No. 2010-0001151.

SUMMARY OF THE INVENTION

It has been recognized that it would be advantageous to develop a frictional holding pad to selectively secure an item, such as a handheld electronic device (e.g. a cell phone, GPS or digital music player) to a support surface (e.g. a dashboard or console of a vehicle) to secure the item in the vehicle, even during movement of the vehicle. In addition, it has been recognized that it would be advantageous to secure the item in such a way as to resist marring or damage or alteration to the support surface. Furthermore, it has been recognized that it would be advantageous to secure the item in such a way without modifying the item. In addition, it has been recognized that it would be advantageous to secure the item with the pad such that the pad remains on the support surface while the item is releasably held or secured to the pad. In addition, it has been recognized that it would be advantageous to secure the item at an incline for improved viewing.

The invention provides a frictional pad in combination with an upward facing support surface of a dashboard or consol of a vehicle upon which the frictional pad is disposed and upon which a cell phone, GPS or digital music player is selectively disposed and held in a non-adhesive, non-slip, tacky fashion by the frictional pad. The pad includes top and bottom surfaces. The bottom surface has a lowermost contact surface that is disposed on the upward facing support surface of the dashboard or console of the vehicle. A pair of opposite sidewalls extends upward on opposite sides of the pad. A pair of inclined slots is each formed in a different one of the pair of sidewalls and oriented at a non-perpendicular angle with respect to the pad and laterally aligned with respect to one another. The cell phone, GPS or digital music player is removably disposable on and frictionally clings to an uppermost contact surface of the pad between the opposite sidewalls and substantially parallel with the pad or uppermost contact surface thereof. The cell phone, GPS or digital music player is also removably disposable in the pair of slots and held inclined with respect to the pad or uppermost contact surface thereof by the pair of sidewalls.

In addition, the invention provides a frictional pad in combination with an upward facing support surface of a dashboard or consol of a vehicle upon which the frictional pad is disposed and upon which a cell phone, GPS or digital music player is selectively disposable and held in a non-adhesive, non-slip, tacky fashion by the frictional pad. The pad includes top and bottom surfaces. The bottom surface has a lowermost contact surface that is disposed on the upward facing support surface of the dashboard or console of the vehicle. A polyurethane squat dome is affixed to the top surface of the pad and has a continuous outward facing surface with a majority being continuous, smooth and parallel with the pad or uppermost contact surface and extends higher than the uppermost contact surface. The dome is translucent or transparent. A graphic layer is disposed behind and is visible through the dome. The cell phone, GPS or digital music player removably is disposed on and frictionally clings to the uppermost contact surface of the pad and the continuous outward facing surface of the squat dome.

Furthermore, the invention provides a frictional pad in combination with an upward facing support surface of a dashboard or consol of a vehicle upon which the frictional pad is disposed and upon which a cell phone, GPS or digital music player is selectively disposed and held in a non-adhesive, non-slip, tacky fashion by the frictional pad. The frictional pad includes top and bottom surfaces. The bottom surface has a lowermost contact surface that is disposed on and frictionally clings to the upward facing support surface of the dashboard or console of the vehicle. At least a substantial portion of the top surface is a contoured top surface with a plurality of separate and discrete indentations extending into the pad and having an uppermost contact surface. A polyurethane squat dome is affixed to the top surface of the pad and has a continuous outward facing surface with a majority being continuous, smooth and parallel with the pad or uppermost contact surface and extending higher than the uppermost contact surface. The dome is translucent or transparent. A graphic layer is disposed behind and is visible through the dome. A pair of opposite sidewalls extends upward on opposite sides of the pad. A pair of inclined slots is each formed in one of the pair of sidewalls at a non-perpendicular angle with respect to the pad and laterally aligned with respect to one another. The cell phone, GPS or digital music player is removably disposable on and frictionally clings to the uppermost contact surface of the pad and the continuous outward facing surface of the squat dome between the opposite sidewalls and substantially parallel with the pad or uppermost contact surface thereof. The cell phone, GPS or digital music player is also removably disposable in the pair of slots and held inclined with respect to the pad or uppermost contact surface thereof by the pair of sidewalls. The lowermost contact surface between the upward facing support surface of the dashboard or console of the vehicle and the pad has a substantially greater surface area than the uppermost contact surface between the item and the pad.

BRIEF DESCRIPTION OF THE DRAWINGS

Additional features and advantages of the invention will be apparent from the detailed description which follows, taken in conjunction with the accompanying drawings, which together illustrate, by way of example, features of the invention; and, wherein.

Reference will now be made to the exemplary embodiments illustrated, and specific language will be used herein to describe the same. It will nevertheless be understood that no limitation of the scope of the invention is thereby intended.

DETAILED DESCRIPTION OF EXAMPLE EMBODIMENT(S)

As illustrated in FIGS. 1-15, a frictional holding pad, indicated generally at 10, in an example implementation in accordance with the invention is shown disposed on or adhered on an upward facing support surface 18, such as a dashboard or console or armrest of a vehicle, and upon which an item, such as a handheld portable electronic device 14, is selectively disposed and held in a non-adhesive, non-slip, tacky fashion to retain the device thereon and/or selectively held in an upright, inclined orientation for improved viewing. The handheld portable electronic device 14 can be, for example, a so-called "smart phone," or cell phone that combines various features or functions, include a map or global positioning system (GPS). Such a smart phone can be held on the pad itself for use as a phone, or to simply be held during driving, and held upright to be used with its map or GPS feature.

In addition, the handheld portable electronic device 14 can be a cell phone; a digital music player (MP3 player, IPod® or the like) or other digital music player; a gaming device (Nintendo® DS; PSP®; etc.); a camera; a global positioning system (GPS) system; a remote control; a personal digital assistant (PDA); a radio; a two-way radio; a citizens band radio; a walkie-talkie; a video recorder; a cassette player and/or recorder; a mini-cassette recorder; a DVD player; a portable television; a digital camera; a video camera; a portable computer (laptop computer, IPad®, or the like); a radar detector; an e-book or e-reader (Kindle®, Nook®, IPad®, Sony Reader™, or the like), etc. Other items may also be retained on the frictional pad, such as writing implements, such as a pen or pencil, eye glasses, sun glasses, change or coins, note pad, parking ticket or receipt, etc. It will be appreciated that the handheld portable electronic device can combine various features or aspects of those listed above. It will be appreciated that other items can be selectively secured to the pad 10.

The upward facing support surface 18 can be a dashboard or console or armrest (and such terms are used interchangeably herein) of a vehicle. The upwardly facing support surface faces generally upwardly, and can be inclined or horizontal, and can be flat or curved in one or more directions. The upward facing surface can be mobile or displaceable, and subject to acceleration (and deceleration and/or centripetal force), and/or impact or bumps, such as a vehicle surface. Movement, momentum and/or acceleration or changes therein can be transferred from the upward facing surface to the item or handheld portable electronic device through the frictional pad. The pad 10 can be tacky to cling to the support surface by mechanical and/or specific adhesion without the use of chemical adhesives; or can be adhered to the upward facing support surface 18; and can receive the electronic device thereon. The support surface 18 can be arcuate in one or more directions, or it can be flat and straight. It will be appreciated that the pad can be disposed on other surfaces.

The frictional holding pad 10 has top and bottom surfaces which can be opposite and substantially parallel with one another. The bottom surface can have a lowermost contact surface 22 that is disposed on and grips the support surface 18. The bottom surface or lowermost contact surface 22 of the pad 10 can be "tacky," such that the pad 10 or lowermost contact surface 22 tends to cling to the support surface 18, such as by mechanical and/or specific adhesion, as opposed to a chemical adhesive.

Figure 9:
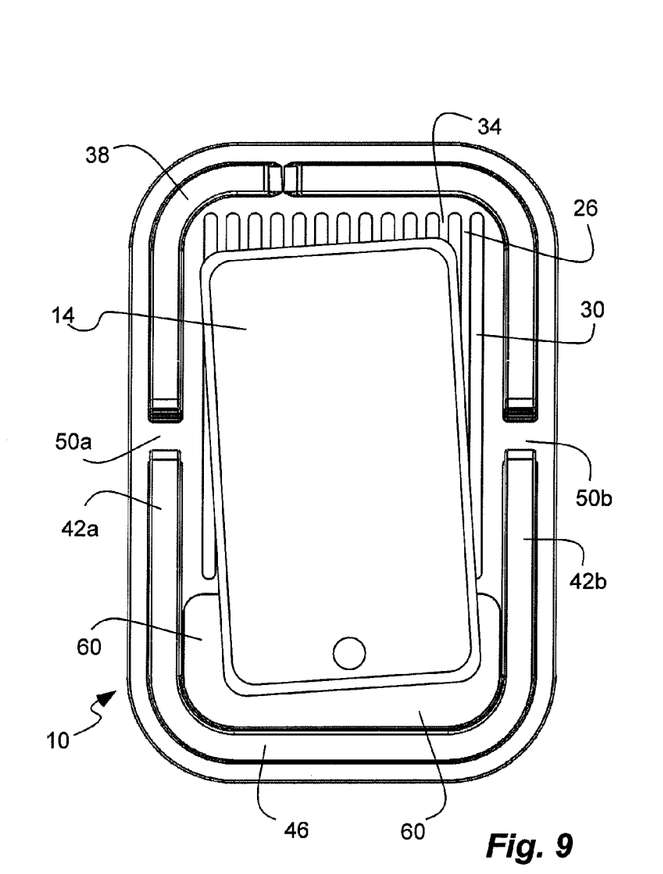
FIG. 9 is a top view of the frictional holding pad of FIG. 1 shown with an item, namely a cell phone, disposed thereon.
Figure 10:
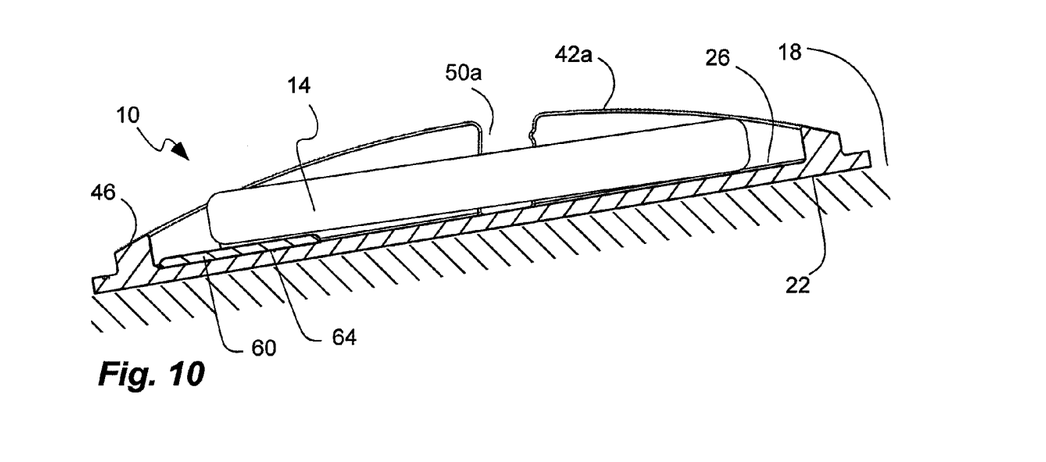
FIG. 10 is a cross-sectional side view of the frictional holding pad of FIG. 1 shown disposed on an upward facing support surface, namely of a dashboard or console of a vehicle, and shown with an item, namely a cell phone, disposed thereon.

Similarly, the top surface can have an uppermost contact surface 26 that contacts and grips the item of handheld electronic device 14, as shown in FIGS. 9 and 10. The top surface or uppermost contact surface 26 of the pad 10 can be "tacky," such that the pad 10 or uppermost contact surface 26 tends to cling to the item or device 14, such as by mechanical and/or specific adhesion, as opposed to chemical adhesive. The uppermost contact surface 26 holds the item or device 14 securely in place, despite movement of the support surface, such as due to movement of the vehicle.

Figure 1:
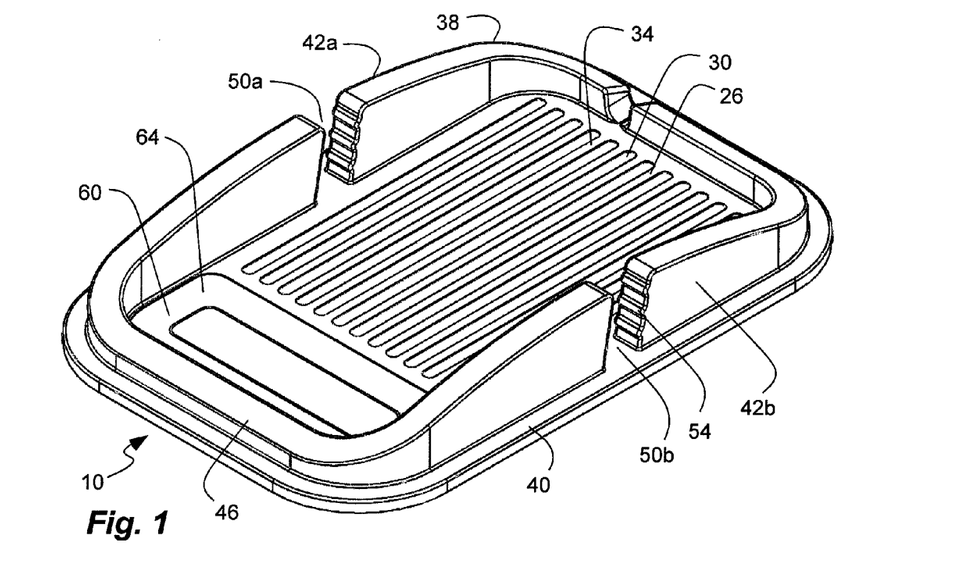
FIG. 1 is a perspective view of a frictional holding pad in accordance with an embodiment of the present invention.
Figure 2:
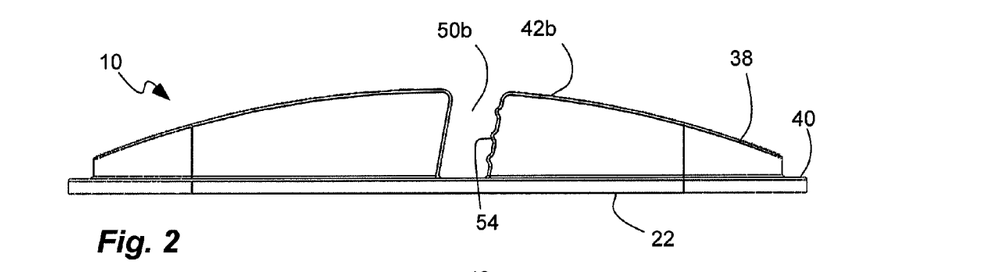
FIG. 2 is a side of the frictional holding pad of FIG. 1.
Figure 3:
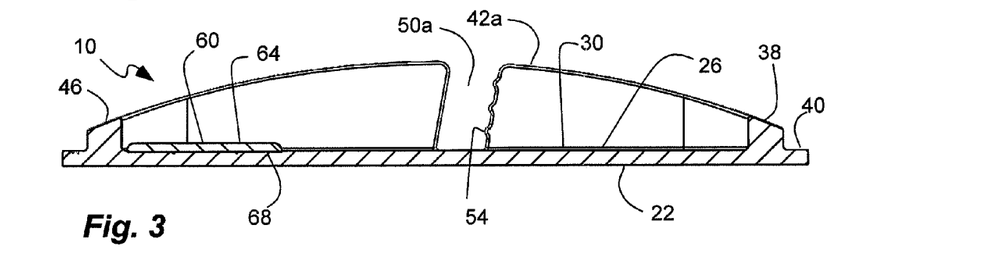
FIG. 3 is a cross-sectional side view of the friction holding pad of FIG. 1.
Figure 4:
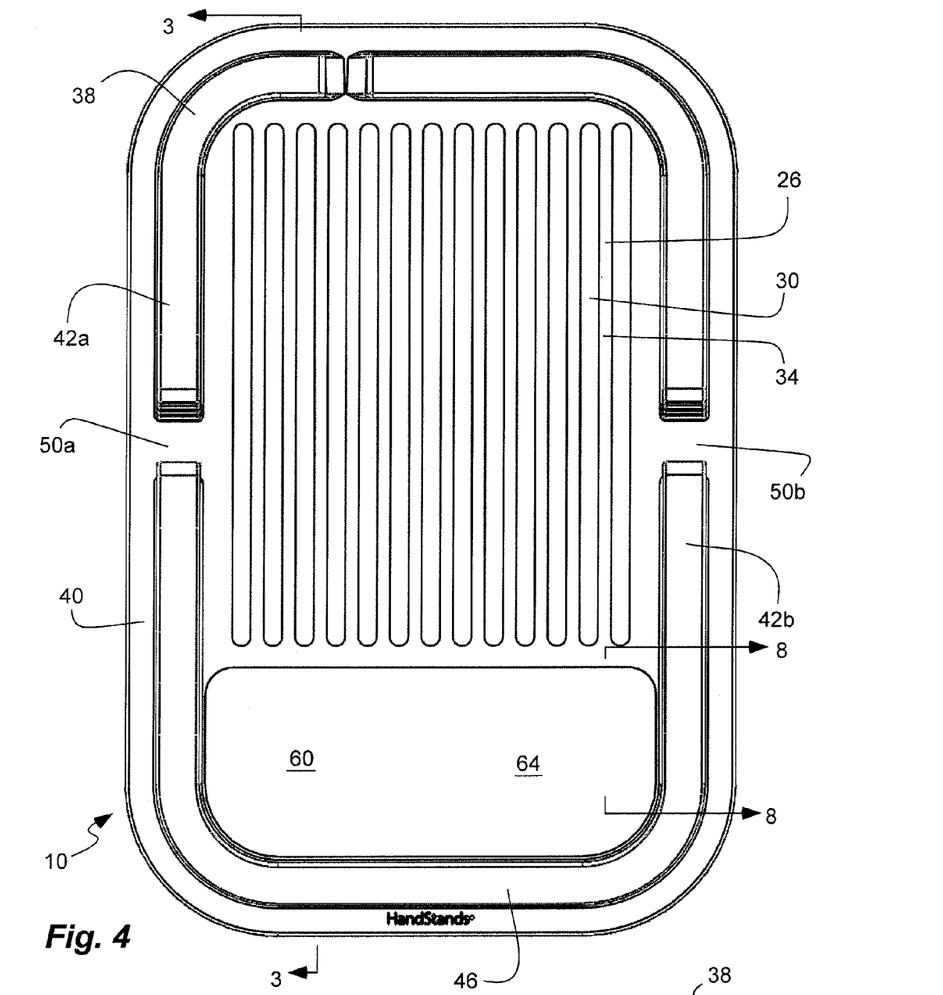
FIG. 4 is a top view of the frictional holding pad of FIG. 1.
Figure 5:
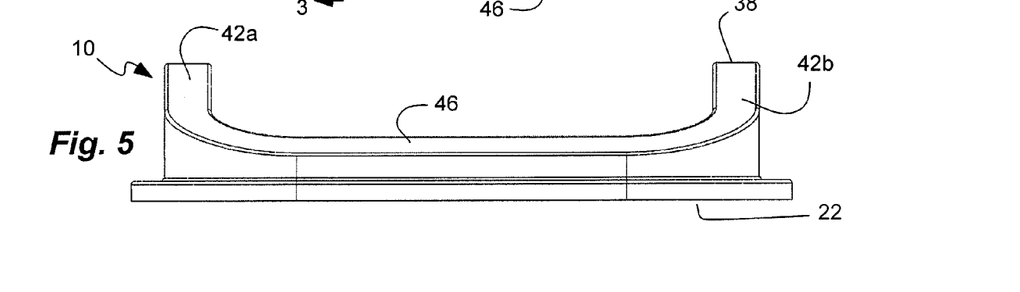
FIG. 5 is a front view of the frictional holding pad of FIG. 1.
Figure 6:
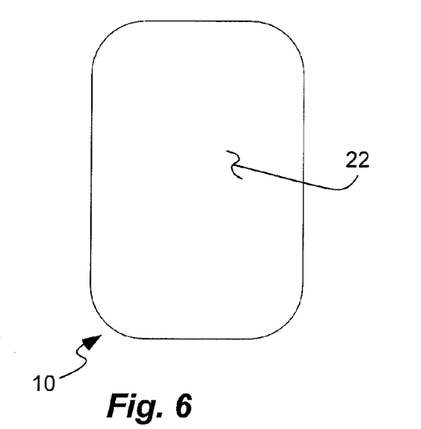
FIG. 6 is a bottom view of the frictional holding pad of FIG. 1.
Figure 7:
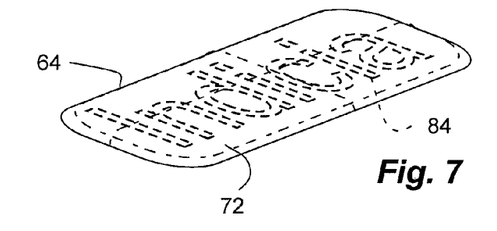
FIG. 7 is a perspective view of a squat dome of the frictional holding pad of FIG. 1.
Figure 8:
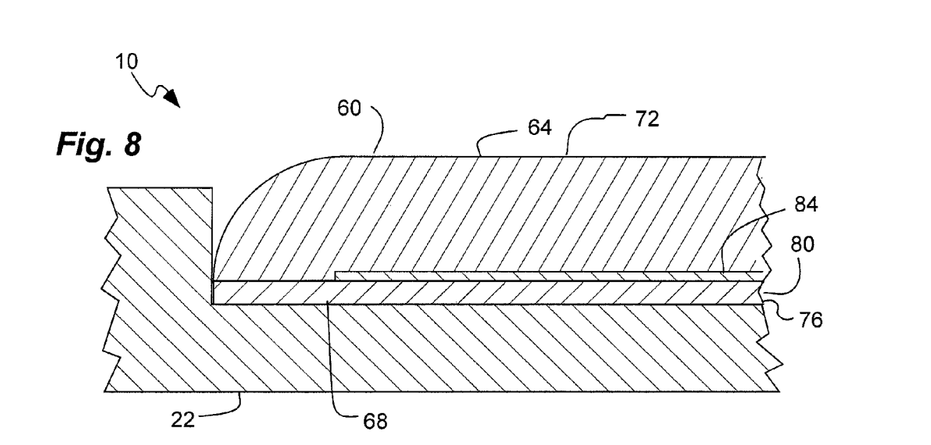
FIG. 8 is a detailed partial cross-sectional side view of the frictional holding pad of FIG. 1.

In one aspect, the lowermost contact surface 22 can be smooth and flat, and can have a shiny appearance, as shown in FIG. 6. In addition, the top surface, or a substantial portion thereof, can be contoured or textured to be a contoured or textured top surface with a plurality of indentations and/or protrusions. The contoured top surface can have a plurality of separate and discrete indentations 30, such as an array of elongated, straight channels or grooves, as shown in FIGS. 1 and 4, defining one or more protrusions 34 or ribs therebetween, and the uppermost contact surface 26 therebetween. The uppermost contact surface 26 or the tops of the protrusions or ribs can be flat between the indentations 30. The contour or texture of the top surface creates an uppermost surface 26 on the top(s) of the protrusion(s) 34 or between the indentations 30 that contact the item or device 14. The lowermost contact surface 22 can be smoother than the uppermost contact surface 26. The uppermost contact surface 26 thus has less surface area in contact with the item or device 14 than the lowermost contact surface 22 has in contact with the support surface 18. Thus, a greater clinging force exists between the pad 10 and the support surface 18 than between the pad 10 and the item or device 14. In other words, the lowermost contact surface 22 can have a greater surface area between the pad 10 and the support surface 18 than a surface area of the uppermost contact surface 26 between the pad 10 and the item or device 14.

In another aspect, the lowermost contact surface can be contoured; while still having a greater surface area than an uppermost contact surface. The greater surface area of the lowermost contact surface 22 can have or can provide a greater surface area in contact with the support surface 18 to provide a greater frictional engagement or grip with the support surface than with the item or device. The less surface area of the uppermost contact surface 26 can have or can provide less surface area in contact with the item or device 14 to provide less frictional engagement or grip with the item or device. Thus, the pad 10 remains on the support surface 18 when the item or device 14 is removed, rather than removing the pad from the support surface while the item or device is removed from the pad. The contours or texture of the top surface reduces the surface area of the uppermost contact surface 26 in contact with the item or device 14 disposed thereon. Thus, the item or device 14 can be removed from the pad 10 without the pad sticking to the item or being removed from the support surface 18. In addition, the item or device 14 can be smaller than the pad itself, thus also contributing to less surface contact between the uppermost contact surface 22 and the item or device 14.

In another aspect, the contoured or textured top surface can have protrusions and/or indentations that can be rounded or curvilinear to form a more gradual transition between the protrusions and indentations, and create a contour on the top surface that is wavy or with a more natural appearance, creating a leather-like texture that can match the support surface.

The contour or texture, or the protrusions and/or indentations, can extend at least substantially across the top surface of the pad, as shown in FIGS. 1 and 4. Thus, the contour or texture extends into an interior region of the pad. The contoured or textured top surface defines an item receiving area where the item or device can be placed. The item receiving area thus extends at least substantially across the top of the pad. The contour or texture can be disposed on a majority of the top surface.

In one aspect, the pad, and thus the uppermost and lowermost contact surfaces, can be formed of or can include an expanded vinyl material or a polyurethane material to provide a "tacky" quality or cling. In another aspect, the pad can be adhered to the support surface. The frictional pad can include an adhesive film adhered to the upward facing support surface. The adhesive can be selected to provide sufficient adhesion between the pad and the support surface without undeliberately separating, or with only deliberately separating by the user. The adhesive can also be selected so that the pad can be removed if desired. Thus, the adhesive film can include a releasable and repositionable adhesive, as opposed to a permanent adhesive. The adhesive film can use a chemical adhesive, and can be a repositionable adhesive film (such as Controltac™ adhesive film by 3M™) that releasably and repositionably adheres to the upward facing support surface. A strength of the adhesive bond between the adhesive film and the support surface can be greater than a tacky cling between the uppermost contact surface of the pad and the item or device. Thus, the pad remains on the support surface while the item or device is removed from the pad and support surface. In addition, the contact surface between the adhesive layer of the pad and the support surface can be greater than the uppermost contact surface of the pad contacting the item or device to further retain the pad on the support surface as the item or device is removed from the pad and support surface.

The pad 10 can have a perimeter wall 38 extending upward from the pad above, or to an elevational height higher than, the top surface or uppermost contact surface 26. The perimeter wall 38 can extend upwardly from a perimeter of the pad, or near a perimeter of the pad, and can surround a majority of the pad. The wall 38 and top surface therebetween can create a cavity or a pocket to receive the item or device 14, as shown in FIGS. 9 and 10. The perimeter wall can be at or near the perimeter of the pad with a portion of the pad extending beyond the perimeter to form a perimeter flange 40 circumscribing the perimeter wall. The flange 40 can help maintain the wall upright. The perimeter wall 38 can be formed integrally with and at the same time as and with the same material as the pad. The pad 10 or perimeter wall 38 can include a pair of opposite sidewalls 42a and 42b extending upward from the pad or top surface on opposite sides of the pad. The pad can have a rectangular shape with narrower front and rear ends and longer lateral sides; and the sidewalls can be formed on the longer lateral sides. In addition, the pad or perimeter wall can include a front wall 46 that can be shorter than the sidewalls, or that can have an elevational height less than that of the sidewalls. The sidewalls can have an elevational height of approximately 0.6-0.8 inches above the pad or uppermost contact surface or top surface. The front wall can have an elevational height of approximately 0.1-0.3 inches. The walls can have a thickness of approximately 0.15-0.35 inches. The elevational height of the walls can transition gradually or at an angle between the front wall and the sidewalls along the front of the sidewalls so that the sidewalls have a variable or increasing height from the front wall to approximately an intermediate point along a length of the sidewalls.

A pair of slots 50a and 50b can be formed in the respective sidewalls 42a and 42b, or each in a different one of the pair of sidewalls. The slots can be located intermediate the length of the sidewalls, such as midway along the sidewalls and midway along the pad, and can be located at the greatest elevational height of the sidewalls. In addition, the slots 50a and 50b can be angled or inclined at a non-perpendicular angle with respect to the pad or top surface or uppermost contact surface, and can be inclined slots. Furthermore, the slots can be laterally aligned with respect to one another across the pad and oriented in the same direction. The incline can slope rearwardly and upwardly. In one aspect, the slots can be inclined with respect to the pad or top surface or uppermost contact surface between 45 and 85 degrees. In another aspect, the slots can be inclined with respect to the pad or top surface or uppermost contact surface at approximately 80 degrees. The slots can have a width of approximately 0.4 inches. In addition, a rear wall or forward facing wall of the slots can have a plurality of teeth or ribs 54 vertically arrayed or spaced-apart vertically and extending laterally. The teeth or ribs can face into the slots. The teeth or ribs can be integrally formed with and of the same material as the wall.

Figure 11:
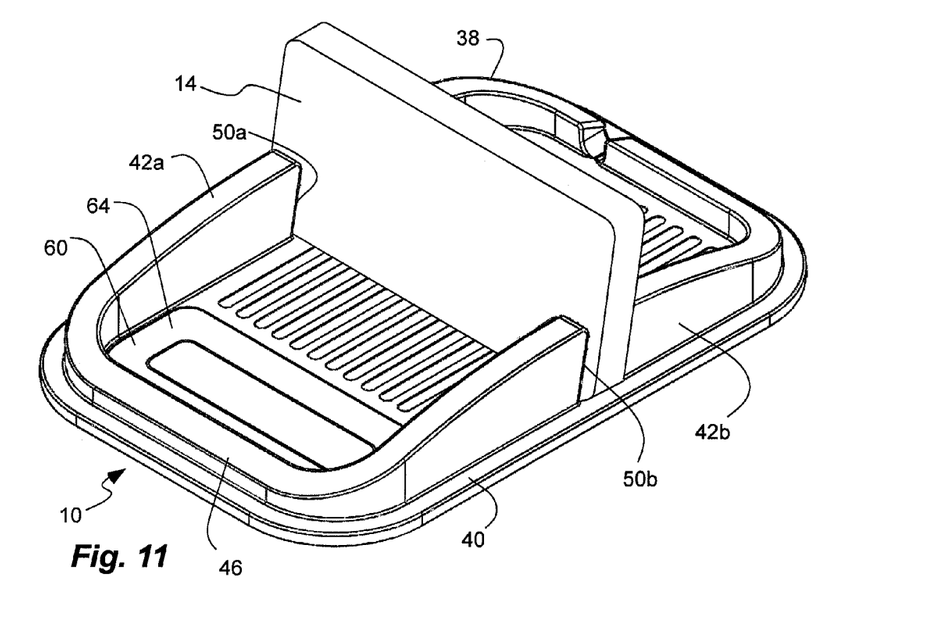
FIG. 11 is a perspective view of the frictional holding pad of FIG. 1 shown with an item, namely a cell phone, held upright at an incline thereon.
Figure 12:
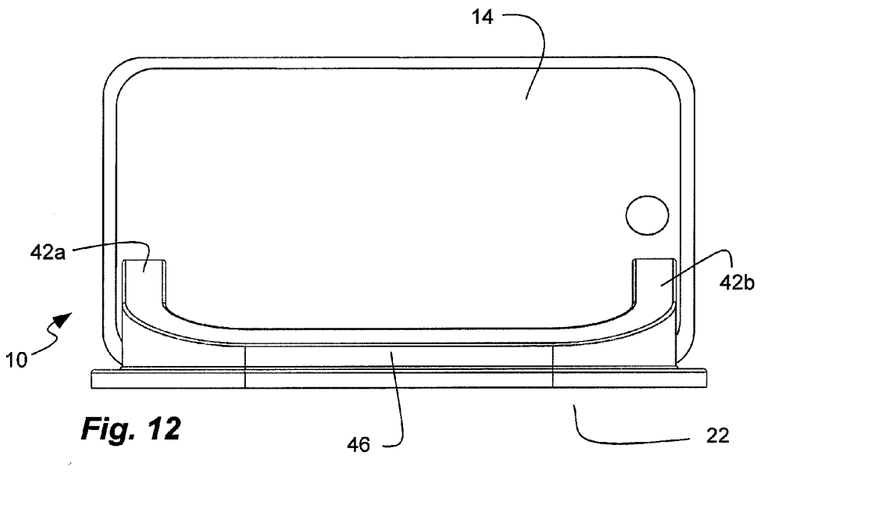
FIG. 12 is front view of the frictional holding pad of FIG. 1 shown with an item, namely a cell phone, held upright at an incline thereon.
Figure 13:
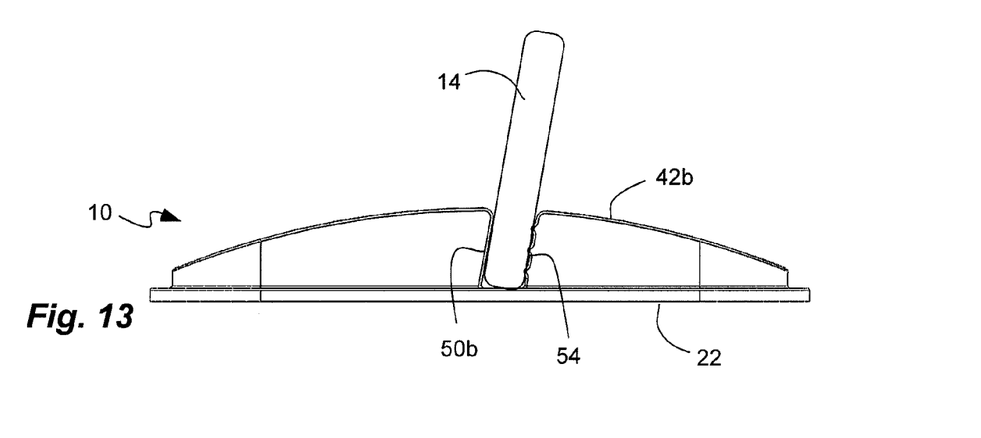
FIG. 13 is a side view of the frictional holding pad of FIG. 1 shown with an item, namely a cell phone, held upright at an incline thereon.
Figure 14:
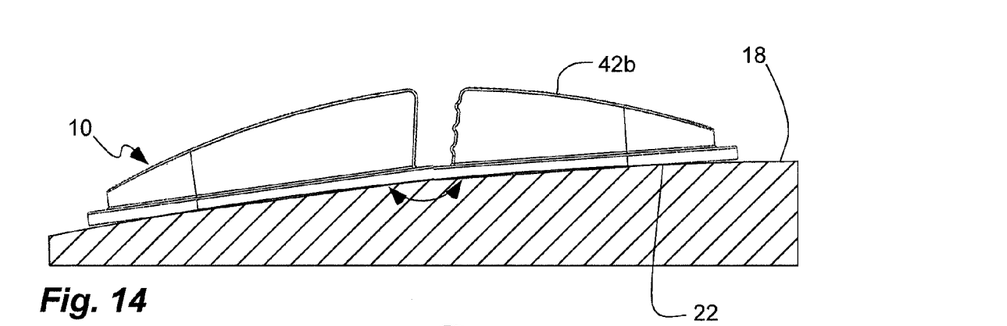
FIG. 14 is a side view of the frictional holding pad of FIG. 1 shown disposed on an upward facing support surface, namely of a dashboard or console of a vehicle.

The item or device 14 can be removably griped or held by the pad in at least two different configurations. In one configuration, the item or device 14 can be removably disposed on the uppermost contact surface 26 of the pad, and can frictionally cling thereto, between the sidewalls 50a and 50b, as shown in FIGS. 9 and 10. In this configuration, the item or device, such as a cell phone, can be disposed and held for use when needed, or held securely while driving a vehicle. In addition, the item or device 14 can rest on the pad and can be substantially parallel with the pad or uppermost contact surface. In another configuration, the item or device 14 can be removably disposed in the pair of slots 50a and 50b, as shown in FIGS. 11-13. Thus, the sidewalls 42a and 42b hold the item or device 14 on opposite sides thereof and at an incline with respect to the pad or the uppermost contact surface. In this configuration, the item or device, such as a cell or smart phone, can be held so that a screen or display is oriented for better viewing, such as to display a map or GPS system. As described above, the device can be held at an angle of between 45 and 85 degrees with respect to the pad. Thus, the width of the slots can match a width of the device, or can be slightly smaller or less to create an interference fit or press fit to physically grip the device. In addition, the teeth or ribs 54 can engage the device and can assist in physically griping or holding the device in the upright or inclined orientation. The lower or shorter front wall 46 allows the screen or display of the device to be viewed. Furthermore, the material of the sidewalls facilitates a frictional grip with the device while also resisting marring of the device.

Figure 15:
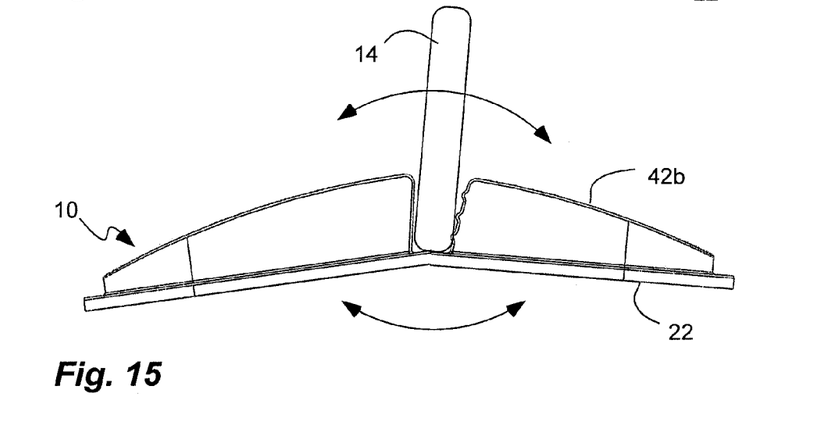
FIG. 15 is a side view of the frictional holding pad of FIG. 1 shown with an item, namely a cell phone, held upright at an incline thereon.

The pad 10 can be flexible and capable of bending (indicated in FIGS. 14 and 15) to conform to curves or details in the support surface 18, and to accommodate the device 14 in the slots 50a and 50b. Thus, the pad can bend at the pair of slots to increase a width of the pair of slots to receive the item or device, and to decrease the width of the slots to grip the item or device, as shown in FIG. 15. The frictional holding pad 10 also can have a planer configuration and can be used on planar surfaces. The frictional holding pad 10 can be provided in an original planar configuration, and can be supported by a paper or paperboard backing or release layer. The release layer may be stiffer than the pad to maintain the pad in a planar configuration. In addition, the release layer can include indicia thereon, such as instructions for use and care of the pad. The release layer can include a tab protruding therefrom beyond a perimeter of the pad 10 to facilitate removal of the release layer from the pad. Upon removal of the release layer, the pad 10 is flexible to enable conformity with a wide array of curved surfaces. In addition, removal of the release layer exposes the lower surface 22 of the pad to be disposed on the support surface. A removable wrapper can be formed around the pad 10 and the backing layer to protect the pad prior to use. The wrapper and backing layer can be removed prior to placing the pad on the support surface.

The pad 10 and walls can be formed of or can include molded polyurethane material. It has been found that the polyurethane material provides a good frictional or "tacky" quality that remains disposed on the support surface, and that retains the item or device thereon. In addition, it has been found that such a polyurethane material typically can be disposed on the support surface 18 without marring or otherwise chemically interfering with the material of many surfaces, such as vehicle dashboards. It will be appreciated that many surfaces, such as a vehicle dashboard, have a finished surface configured to be aesthetically pleasing and luxurious. Such surfaces can be formed of a plastic or leather material, and can be expensive to replace or repair. In addition, it will be appreciated that some surfaces are subjected to extreme conditions, such as heat and sunlight. It has been found that the polyurethane material not only provides the required retention of objects and fixed relationship with the surface, but also typically does so without chemically interacting with the material of surface, or otherwise damage the surface.

The polyurethane material of the frictional holding pad 10 forms a temporary non-chemical bond with both 1) the item or device 14 stored on the uppermost contact surface, and 2) the support surface. The pad 10 can be removed from the support surface without leaving behind any residue and without damaging the pad. In this manner the pad 10 can be easily moved to any location the user desires. Because the pad is made from a polyurethane material, it can be easily cleaned with soap and water, and still retain its tackiness, and is thus reusable.

In addition, the pad, and thus the polyurethane material, can be translucent or transparent. Thus, surface details on the support surface can be viewed or are visible through the pad. The translucent or transparent nature of the pad can make the pad blend-in or match the support surface because of the surface details showing through the pad. If the pad is translucent, it can also include a light coloring. Such coloring can help visually distinguish the pad from the support surface. Thus, a translucent pad can both blend with the surface while still being visually distinguishable therefrom. The pad also can include indicia formed thereon. The indicia can be formed on the bottom surface of the pad and still be visible because the pad is translucent or transparent. Forming the indicia on the bottom surface of the pad can also protect the indicia from wear or removal.

In one aspect, as described above, the pad can have an adhesive film. The adhesive and/or the adhesive film can be substantially transparent, or at least translucent, so that the support surface can be visible through the pad, including the adhesive. The adhesive and/or adhesive layer can be a removable 3M Controltac™ adhesive. The adhesive film can be disposed on a substrate. The substrate can also be a film. In one aspect, the substrate can be substantially non-absorbent. The substrate can provide a surface, such as an upper surface opposite the adhesive that can be printable. In addition, the substrate can be substantially transparent, or at least translucent, so that the support surface can be visible through the pad. The substrate can be a printed 3M Graphics Vinyl. Alternatively, the substrate can be a polyester film. The substrate can be any laminated (non-porous) substrate, including: PP, PVC, PET, ABS, polyester, regular sticker paper, vinyl, or tin metal (foil). Alternatively, the substrate can be other films with other characteristics, such as reflective, metal shine, textured, etc.

In addition, the indicia can be formed on the top or the top surface of the pad. In one aspect, the pad can include a printable portion or section that can be flat and separate from the contoured or textured section. In another aspect, the pad can include an insert 60 such as a polyurethane squat dome 64 adhered to or otherwise affixed to the tope surface of the pad. For example, the dome 64 can be adhered with an adhesive film as described above. The dome can be disposed within the perimeter wall 38, and visible over the shortened front wall 46. In addition, the dome 64 can be disposed in a recess 68 or indentation in the top surface of the pad. The dome can have a broad, flat, squat shape with an upward facing or outward facing or outfacing surface 72 that faces and can contact the item or device 14. A majority, or essentially all, of the outward facing surface can be continuous and smooth and parallel with the pad or uppermost contact surface. In addition, the outward facing surface can be flat or substantially flat. Furthermore, the outward facing surface can be surrounded by a radius perimeter. Thus, the perimeter of the outward facing surface curves toward the pad. In one aspect, all of the outward facing surface 72 can be flat and smooth and continuous between the radiused perimeter. The dome and/or outward facing surface can be tacky to cling to the item or device, such as by mechanical or specific adhesion. Furthermore, the dome can be substantially transparent, or at least translucent, so that the support surface can be visible through the pad and the dome. The dome can be formed of polyurethane.

The dome 64 or the outward facing surface 72 thereof can also provide a non-slip surface or contact point that can engage the item or device 14 and retain it on the outward facing surface of the pad, as shown in FIG. 10. Thus, the outward facing surface 72 can be sufficiently tacky to cling to the item or device 14. The tackiness of the outward surface can be obtained through various factors, which can include material, hardness/softness, and coefficient of friction. As described above, the dome can be formed of polyurethane. The polyurethane can be formed by combining a polyol with a catalyst or hardener. In one aspect, the ratio of polyol to catalyst can be between 0.63 to 0.85 in one aspect, and between 0.63 to 0.75 in another aspect, so that there is more polyol than catalyst. Typical polyurethane is obtained by mixing polyol and catalyst in a 1:1 ratio. In addition, in one aspect, the outward facing surface 72 or dome 64 can have a hardness between 10 and 35 Shore D. In another aspect, the outward facing surface 72 or dome 64 can have a hardness between 12 and 21 Shore D. In another aspect, the outward facing surface 72 or dome 64 can have a hardness between 12 and 18 Shore D. Other non-tacky stickers or decals typically can have a hardness of 60 Shore D or harder. Furthermore, the outward facing surface 72 can have a coefficient of friction of between 0.3 and 0.1 in accordance with ASTM D 1894.

The dome 64 can include an adhesive film 76 adhered to the top surface of the pad. The adhesive can be selected to provide sufficient adhesion between the dome and the pad. The adhesive film can use a chemical adhesive that adheres to the top surface of the pad. In addition, the adhesive and/or the adhesive film can be substantially transparent, or at least translucent, so that the support surface can be visible through the pad. The adhesive film 76 can be disposed on a substrate 80. The substrate 80 can also be a film. In one aspect, the substrate can be substantially non-absorbent. The substrate can provide a surface, such as an upper surface opposite the adhesive that can be printable. In addition, the substrate can be substantially transparent, or at least translucent, so that the support surface can be visible through the pad. The substrate can be a printed 3M Graphics Vinyl. Alternatively, the substrate can be a polyester film. The substrate can be any laminated (non-porous) substrate, including: PP, PVC, PET, ABS, polyester, regular sticker paper, vinyl, or tin metal (foil). Alternatively, the substrate can be other films with other characteristics, such as reflective, metal shine, textured, etc.

A graphic layer 84 can be disposed behind the dome 64 and visible through the dome. Thus, the graphic layer 84 can be disposed between the pad 10 or top surface (or adhesive film) and the dome 64, or between the substrate 80 and the dome 64. The graphic layer can include ink disposed on or printed on the substrate. For example, the graphic layer can be an aqueous based inkjet ink. The graphic layer can include indicia, such as a logo, a picture, etc. In addition, the graphic layer can include directions for use, orientation, care, etc. Furthermore, the graphic layer can be or can include other inclusions, as described in greater detail below. The graphic layer 84 can be visible through the dome 64. The graphic layer and/or inclusion can be smaller or can have a smaller size than the substrate and dome such that the graphic layer and inclusion are surrounded by a perimeter of the dome and substrate.

Furthermore, the dome 64 or outward facing surface 72 thereof can be parallel with the pad or uppermost contact surface, and can extend higher that the uppermost contact surface of the pad. Thus, the item or device 14 can have two points of contact, one with the outward facing surface 72 of the dome 64, and another with the uppermost contact surface 26 of the pad.

As discussed above, the dome or outward facing surface can have a radius perimeter. The dome can be made by pouring the polyurethane material on top of the substrate and graphic layer to form the dome. Thus, the radius perimeter is obtained by individual pouring each pad or dome, without stamping or cutting the pads from a continuous layer. The graphic layer can be printed on the substrate having the adhesive film opposite the graphic layer. The graphic layer can be a discrete graphic contained within the dome, as opposed to a continuous graphic.

In use an item or device 14 can be releasably secured on a support surface 18, such as a dashboard or console of a vehicle, without marring or altering the support surface. The pad 10 is placed on the support surface 18 with the lowermost contact surface 22 of the pad contacting and frictionally clinging to the support surface. Alternatively, the adhesive film of the pad can be adhered to the support surface in a desired location. The item or device 14 is removably placed on the uppermost contact surface 26 of the pad with the uppermost contact surface of the pad frictionally clinging to the item or device. The item or device 14 is removably placed in the pair of slots 50a and 50b of the pair of walls 42a and 42b, and held in an inclined orientation with respect to the pad. The item or device 14 can be removed from the uppermost contact surface 26 of the pad and/or the pair of slots 50a and 50b of the pad while the pad remains on the support surface. In addition, the support surface can be viewed through at least a portion of the pad that is at least translucent.

As described above, the pad can also include a contoured or textured bottom surface. Such a pad can have different top and bottom surfaces. Also as described above, the contoured or textured top surface can have an uppermost contact surface that is less than a lowermost contact surface the bottom surface. The contoured or textured bottom surface can include a plurality of protrusions and/or indentations similar to the top surface. The protrusions and indentations of the bottom surface can be similar to those of the top surface, but can provide a lowermost contact surface to contact and frictionally cling to the support surface. The lowermost contact surface of the bottom surface can have a greater surface area than the uppermost contact surface of the top surface. For example, the protrusions of the bottom surface can be larger than the protrusions of the upper surface. Or the indentations of the bottom surface can be larger than the indentations of the top surface. Or the top surface can have more indentations than the bottom surface.

Also as described above, the pad, any adhesive on the bottom of the pad, the dome, an adhesive and any substrate between the dome and the pad, can be translucent or transparent, or have at least a portion that is at least translucent. Thus, the support surface or features thereof can be visible through the pad so that the pad blends-in with the support surface. The pad can formed of polyurethane, which has been found to provide both tackiness and transparency/translucency, without marring most vehicle surfaces.

Also as described above, indicia can be formed on the top surface of the pad, the bottom surface of the pad, or between the pad and the dome. The indicia can include: a logo, an advertisement, an instruction, a promotion, a company name, and a product name. The top surface can include a flat section 354 that is flat, and upon which the indicia 350 can be disposed. In addition, the top surface can include a remaining section, laterally adjacent the flat section, that is contoured and configured to receive the item. Thus, the upper surface can have two separate and discrete sections.

As indicated above, the graphic layer can be or can include an inclusion. The inclusions can be embedded in the dome. For example, the graphic layer can be an etched metallic layer. The metallic layer can be etched to form the indicia. Other inclusions can be an LED (or other light source) and a battery power source; a hologram or lenticular artwork; an RFID computer chip or tag; a mirror; one or more gems; etc. For example, the inclusion can include an LED electrically coupled to a battery. The LED may remain continuously activated or lit. Alternatively, the LED may be activated, or the leads for the LED selectively contacted by the battery, such as by pressure applied to the pad. Alternatively, a light sensor can be electrically coupled between the battery and the LED to activate the LED in low light conditions. Other electronics can be included for special effects, such as flashing, etc. It will be appreciated that multiple lights or LEDs or one or more color can be included or embedded in the dome. As another example, the inclusion can include a gem or faux gem embedded in the dome. The inclusion(s) can be disposed on the adhesive film and/or substrate, and surrounded by the material of the dome so that the inclusion projects into the dome. Thus, the inclusions can be inclusions for the dome and/or the graphics layer.

The dome can also include inclusions embedded therein. For example, the dome can include a scented material, such as a scented oil, that is permeable through the polyurethane material of the dome. In addition, the dome can be colored and translucent. Furthermore, the dome can include a florescent material, or a glowing material.

In another aspect, the dome can be opaque with a graphic layer, such as printing, on the outward facing surface. The opaque dome can have a color to match or complement the pad.

In other aspects, the wall can be or can include: curved, such as to hold a pen or other writing implement; curved or slotted, such as to hold electrical or data cords, such as phone charger cords; slotted to hold a parking card, credit card, access card, security card, or the like or other thin (paper thin to credit card thin) item with indicia or information thereof for ready access; a graphic arrow molded into bar to show placement direction on dash; a location for an embedded company logo; glow in dark bar or other structure so that the user can see location of sticky pad on dashboard at night; put radar detector at optimal angle for signal; a raised rubber or other non-stick area to protect cell phone battery cover from getting stuck (or limiting cling); insert a thermometer into the pad or wall to indicate temperature; embedded a "fast pass" electronic signal toll pass or other electrical indicator for access or recording purposes; a coin or token holder; a button to hold a micro fiber bag; a place for a statuette to mount to; a fastener for an air freshener; etc.

Figure 16:
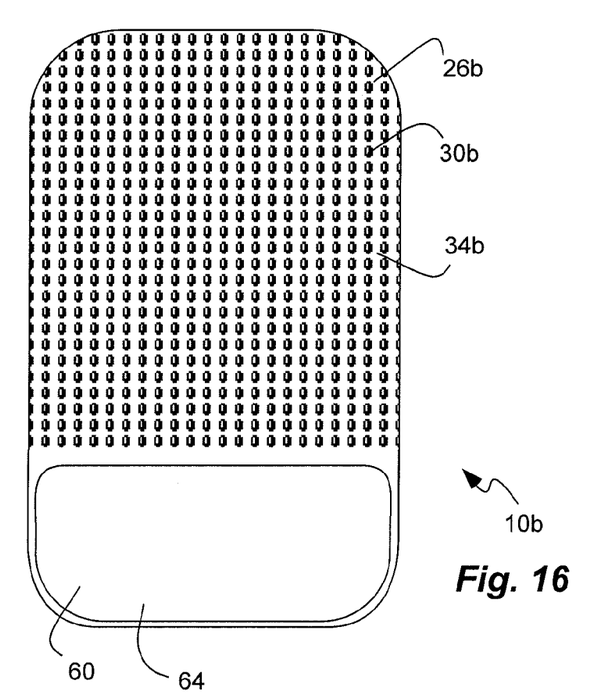
FIG. 16 is a top view of another frictional holding pad in accordance with another embodiment of the present invention.
Figure 17:
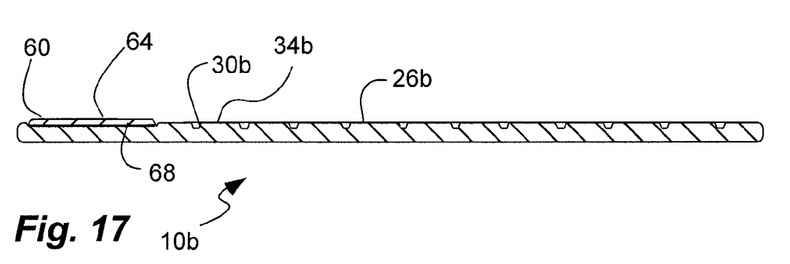
FIG. 17 is a cross-sectional side view of the frictional holding pad of FIG. 16.

Referring to FIGS. 16 and 17, another pad 10b is shown that is similar in many respects to that described above, and which description is herein incorporated by reference, but without a perimeter wall. The pad 10b can include a dome 64 as described above. The pad can also have a contoured or textured top surface with an uppermost contact surface 26b and a plurality of separate and discrete indentations 30b, and one or more protrusions 34b.

In another aspect, the pad can be formed of or can include an expanded vinyl material. It has been found that the expanded vinyl material provides a good frictional or "tacky" quality that remains disposed on the support surface, and that retains the item or device thereon. In addition, it has been found that such an expanded vinyl material typically can be disposed on the support surface without marring or otherwise chemically interfering with the material of many surfaces, such as vehicle dashboards. It will be appreciated that many surfaces, such as a vehicle dashboard, have a finished surface configured to be aesthetically pleasing and luxurious. Such surfaces can be formed of a plastic or leather material, and can be expensive to replace or repair. In addition, it will be appreciated that some surfaces are subjected to extreme conditions, such as heat and sunlight. It has been found that the expanded vinyl material not only provides the required retention of objects and fixed relationship with the surface, but also typically does so without chemically interacting with the material of surface, or otherwise damage the surface.

The expanded vinyl material of the pad forms a temporary non-chemical bond with both 1) the item or device stored on the uppermost surface, and 2) the support surface. The pad can be removed from the support surface without leaving behind any residue and without damaging the pad. In this manner the pad can be easily moved to any location the user desires. Because the pad is made from expanded vinyl, it can be easily cleaned with soap and water, and still retain its tackiness, and is thus reusable.

The expanded vinyl material more specifically can include: diisodecy/phlthalate; polymeric plasticer; a UV stabilizer; a vinyl hear stabilizer; a blowing agent for vinyl plastisol; and vinyl resin (plastic). The expanded vinyl material can have a weight between approximately 10 and 20 ounces per square yard; more preferably between approximately 12 and 18 ounces per square yard; and most preferably between approximately 14 and 16 ounces per square yard. The frictional holding pad 10 can have a thickness between approximately 0.03 and 0.09; more preferably between approximately 0.04 and 0.08 inches; and most preferably between approximately 0.05 and 0.06 inches.

The frictional holding pad can be formed of different layers with different materials. For example, the pad can have a skin layer formed on the bottom surface formed of a different material than the rest of the pad. For example, the material of the skin layer can include: aqua ammonia ($NH_4OH$); azardine; rubber; color; and body for thickening. The skin layer can have a thickness between 0.003 and 0.006 inches, and more preferably between 0.004 and 0.005 inches.

In addition, a perforated pattern can be formed in the pad to give the impression of a stitching. For example, a plurality of holes can be formed around a perimeter of the pad near the edge to give the appearance of a stitched edge that can be more visually consistent with the support surface. The pad can be die cut from a larger sheet of material. The perforated pattern can similarly be formed by a die.

The frictional holding pad also can include indicia formed on the upper surface. The indicia can be formed by ink, or ink-like materials, printed on the upper surface. The frictional holding pad can be used as a promotional item by including a business or product logo or name. It will be appreciated that such frictional holding pads can be inexpensively manufactured, and in use, can occupy a position of high and frequent visibility. Thus, such frictional holding pads can be inexpensively manufactured, and given away as promotional items. In addition, the indicia can include instructions that can be related or unrelated to the use or care of the pad. For example, the instructions can include how to use or place the pad, and how to clean or wash the pad. As another example, the instructions can relate to the use of something other than the pad itself, such as an item to be disposed thereon. Thus, the pad serves dual functions, both as a frictional holding pad to secure and item, and providing ready instructions. The instructions can relate to the use of the item to be disposed thereon. Thus, such a pad can be provided with an item, or provided for use with such an item. For example, the instructions can relate to the use of a cellular phone. In addition, the indicia can include warning, such as warning not to drive while talking on the phone.

Although the pads described above have been described with particularly reference to vehicle surfaces, it will be appreciated that the pad can be used with other surfaces, including for example: to hold books or e-readers on a treadmill, exercise bike, or the like.

In another aspect, the adhesive between the support surface or dashboard and the dome or pad can be a permanent adhesive or more permanent adhesive.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. A frictional pad in combination with an upward facing support surface of a dashboard or consol of a vehicle upon which the frictional pad is disposed and upon which a cell phone, GPS or digital music player is selectively disposed and held in a non-adhesive, non-slip, tacky fashion by the frictional pad, the frictional pad comprising:
   a) top and bottom surfaces, the bottom surface having a lowermost contact surface that is disposed on the upward facing support surface of the dashboard or console of the vehicle;
   b) a pair of opposite sidewalls extending upward on opposite sides of the pad;
   c) a pair of inclined slots each formed in a different one of the pair of sidewalls oriented at a non-perpendicular angle with respect to the pad and laterally aligned with respect to one another;
   d) the cell phone, GPS or digital music player removably disposable on and frictionally clinging to an uppermost contact surface of the pad between the opposite sidewalls and substantially parallel with the pad or uppermost contact surface thereof; and
   e) the cell phone, GPS or digital music player removably disposable in the pair of slots and held inclined with respect to the pad or uppermost contact surface thereof by the pair of sidewalls; and
   f) the pad being flexible and bending at the pair of slots to increase a width of each of the pair of slots to receive the cell phone, UPS or digital music player therein, and to decrease the width of each of the slots to grip the cell phone, GPS or digital music player therein.

2. The combination in accordance with claim 1, further comprising:
   teeth formed in the pair of sidewalls and facing into the pair of slots and engaging the cell phone, GPS or digital music player.

3. The combination in accordance with claim 1, wherein:
   the pair of slots are inclined with respect to the pad between 45 and 85 degrees from the pad.

4. The combination in accordance with claim 1, wherein:
   the pair of opposite sidewalls form a portion of a perimeter wall surrounding a majority of the pad; and
   the perimeter wall includes a front wall with an elevational height less than an elevational height of the pair of sidewalls.

5. The combination in accordance with claim 1, wherein:
   the lowermost contact surface of the pad frictionally clings to the upward facing support surface of the dashboard or console of the vehicle.

6. The combination in accordance with claim 1, wherein:
   the lowermost contact surface of the pad frictionally is adhered to the upward facing support surface of the dashboard or console of the vehicle with a repositionable adhesive film releasably and repositionably adhered to the upward facing support surface.

7. The combination in accordance with claim 1, further comprising:
at least a substantial portion of the top surface being a contoured top surface with a plurality of separate and discrete indentations extending into the pad and having an uppermost contact surface.

8. The combination in accordance with claim 1, further comprising:
a polyurethane squat dome affixed to the top surface of the pad and having a continuous outward facing surface with a majority being continuous, smooth and parallel with the pad or uppermost contact surface and extending higher than the uppermost contact surface.

9. The combination in accordance with claim 8, further comprising:
the polyurethane dome includes a polyurethane material with a polyol and a catalyst in a ratio of 0.63 to 0.85.

10. The combination in accordance with claim 8, further comprising:
the dome being translucent or transparent.

11. The combination in accordance with claim 10, further comprising:
a graphic layer disposed behind and visible through the dome.

12. The combination in accordance with claim 1, wherein:
the lowermost contact surface between the upward facing support surface of the dashboard or console of the vehicle and the pad has a substantially greater surface area than the uppermost contact surface between the item and the pad.

13. A frictional pad in combination with an upward facing support surface of a dashboard or consol of a vehicle upon which the frictional pad is disposed and upon which a cell phone, GPS or digital music player is selectively disposed and held in a non-adhesive, non-slip, tacky fashion by the frictional pad, the frictional pad comprising:
a) top and bottom surfaces, the bottom surface having a lowermost contact surface that is disposed on the upward facing support surface of the dashboard or console of the vehicle;
b) a polyurethane squat dome affixed to the top surface of the pad and having a continuous outward facing surface with a majority being continuous, smooth and parallel with the pad or uppermost contact surface and extending higher than the uppermost contact surface;
c) the dome being translucent or transparent;
d) a graphic layer disposed behind and visible through the dome;
e) the cell phone, GPS or digital music player removably disposable on and frictionally clinging to the uppermost contact surface of the pad and the continuous outward facing surface of the squat dome.

14. The combination in accordance with claim 13, wherein:
the lowermost contact surface of the pad frictionally clings to the upward facing support surface of the dashboard or console of the vehicle.

15. The combination in accordance with claim 13, wherein:
the lowermost contact surface of the pad frictionally is adhered to the upward facing support surface of the dashboard or console of the vehicle with a repositionable adhesive film releasably and repositionably adhered to the upward facing support surface.

16. The combination in accordance with claim 13, further comprising:
at least a substantial portion of the top surface being a contoured top surface with a plurality of separate and discrete indentations extending into the pad and having an uppermost contact surface.

17. The combination in accordance with claim 13, further comprising:
a) a pair of opposite sidewalls extending upward on opposite sides of the pad; and
b) a pair of inclined slots each formed in one of the pair of sidewalls at a non-perpendicular angle with respect to the pad and laterally aligned with respect to one another; and
c) the cell phone, GPS or digital music player removably disposable in the pair of slots and held inclined with respect to the pad or uppermost contact surface thereof by the pair of sidewalls.

18. The combination in accordance with claim 17, further comprising:
teeth formed in the pair of sidewalls and facing into the pair of slots and engaging the cell phone, GPS or digital music player.

19. The combination in accordance with claim 17, wherein:
the pad is flexible and bends at the pair of slots to increase a width of each of the pair of slots to receive the cell phone, GPS or digital music player therein, and to decrease the width of each of the slots to grip the cell phone, GPS or digital music player therein.

20. The combination in accordance with claim 17, wherein:
the pair of slots are inclined with respect to the pad between 45 and 85 degrees from the pad.

21. The combination in accordance with claim 17, wherein:
the pair of opposite sidewalls form a portion of a perimeter wall surrounding a majority of the pad; and
the perimeter wall includes a front wall with an elevational height less than an elevational height of the pair of sidewalls.

22. The combination in accordance with claim 13, wherein:
the lowermost contact surface between the upward facing support surface of the dashboard or console of the vehicle and the pad has a substantially greater surface area than the uppermost contact surface between the item and the pad.

23. A frictional pad in combination with an upward facing support surface of a dashboard or consol of a vehicle upon which the frictional pad is disposed and upon which a cell phone, GPS or digital music player is selectively disposed and held in a non-adhesive, non-slip, tacky fashion by the frictional pad, the frictional pad comprising:
a) top and bottom surfaces, the bottom surface having a lowermost contact surface that is disposed on and frictionally clings to the upward facing support surface of the dashboard or console of the vehicle;
b) at least a substantial portion of the top surface being a contoured top surface with a plurality of separate and discrete indentations extending into the pad and having an uppermost contact surface;
c) a polyurethane squat dome affixed to the top surface of the pad and having a continuous outward facing surface with a majority being continuous, smooth and parallel with the pad or uppermost contact surface and extending higher than the uppermost contact surface;

d) the dome being translucent or transparent;
e) a graphic layer disposed behind and visible through the dome;
f) a pair of opposite sidewalls extending upward on opposite sides of the pad;
g) a pair of inclined slots each formed in one of the pair of sidewalls at a non-perpendicular angle with respect to the pad and laterally aligned with respect to one another;
h) the cell phone, GPS or digital music player removably disposable on and frictionally clinging to the uppermost contact surface of the pad and the continuous outward facing surface of the squat dome between the opposite sidewalls and substantially parallel with the pad or uppermost contact surface thereof;
i) the cell phone, GPS or digital music player removably disposable in the pair of slots and held inclined with respect to the pad or uppermost contact surface thereof by the pair of sidewalls; and
j) the lowermost contact surface between the upward facing support surface of the dashboard or console of the vehicle and the pad has a substantially greater surface area than the uppermost contact surface between the item and the pad.

24. A frictional pad in combination with an upward facing support surface of a dashboard or consol of a vehicle upon which the frictional pad is disposed and upon which a cell phone, GPS or digital music player is selectively disposed and held in a non-adhesive, non-slip, tacky fashion by the frictional pad, the frictional pad comprising:
   a) top and bottom surfaces, the bottom surface having a lowermost contact surface that is disposed on the upward facing support surface of the dashboard or consol of the vehicle;
   b) a pair of opposite sidewalls extending upward on opposite sides of the pad;
   c) a pair of inclined slots each formed in a different one of the pair of sidewalls oriented at a non-perpendicular angle with respect to the pad and laterally aligned with respect to one another;
   d) the cell phone, GPS or digital music player removably disposable on and frictionally clinging to an uppermost contact surface of the pad between the opposite sidewalls and substantially parallel with the pad or uppermost contact surface thereof;
   e) the cell phone, GPS or digital music player removably disposable in the pair of slots and held inclined with respect to the pad or uppermost contact surface thereof by the pair of sidewalls; and
   f) teeth formed in the pair of sidewalls and facing into the pair of slots and engaging the cell phone, GPS or digital music player.

25. A frictional pad in combination with an upward facing support surface of a dashboard or consol of a vehicle upon which the frictional pad is disposed and upon which a cell phone, GPS or digital music player is selectively disposed and held in a non-adhesive, non-slip, tacky fashion by the frictional pad, the frictional pad comprising:
   a) top and bottom surfaces, the bottom surface having a lowermost contact surface that is disposed on the upward facing support surface of the dashboard or consol of the vehicle;
   b) a pair of opposite sidewalls extending upward on opposite sides of the pad;
   c) a pair of inclined slots each formed in a different one of the pair of sidewalls oriented at a non-perpendicular angle with respect to the pad and laterally aligned with respect to one another;
   d) the cell phone, GPS or digital music player removably disposable on and frictionally clinging to an uppermost contact surface of the pad between the opposite sidewalls and substantially parallel with the pad or uppermost contact surface thereof;
   e) the cell phone, GPS or digital music player removably disposable in the pair of slots and held inclined with respect to the pad or uppermost contact surface thereof by the pair of sidewalls; and
   f) at least a substantial portion of the top surface being a contoured top surface with a plurality of separate and discrete indentations extending into the pad and having an uppermost contact surface.

* * * * *